March 22, 1938.  W. F. HEROLD  2,111,561
CASTER
Filed Aug. 26, 1936
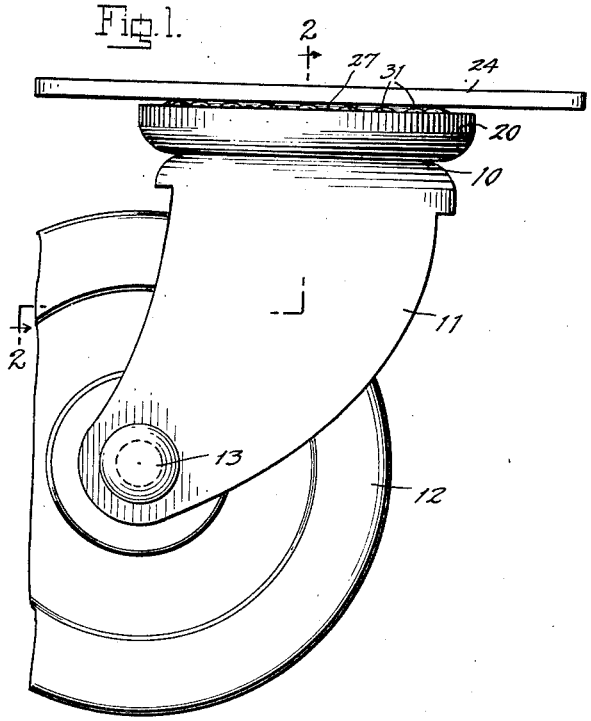
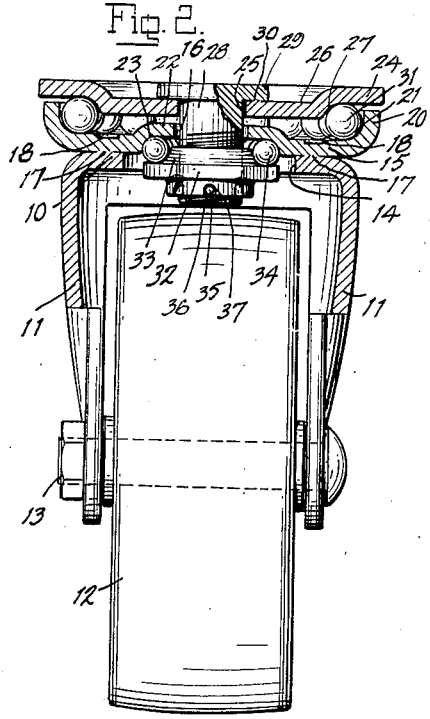
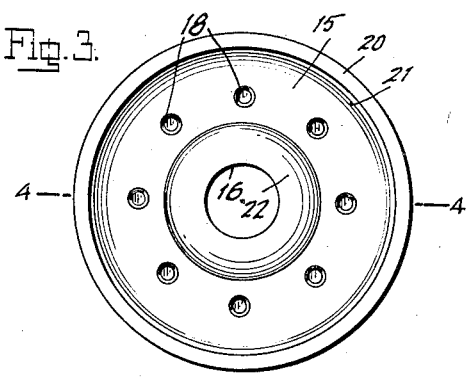
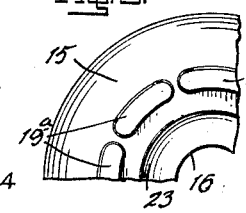
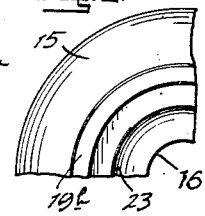
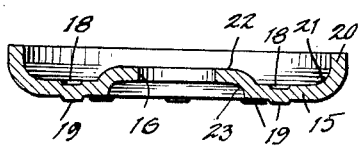
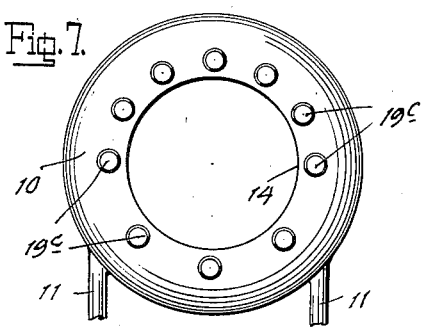
INVENTOR
WALTER F. HEROLD.
BY
ATTORNEY Patented Mar. 22, 1938

2,111,561

UNITED STATES PATENT OFFICE 2,111,561

CASTER

Walter F. Herold, Bridgeport, Conn., assignor to The Bassick Company, Bridgeport, Conn., a corporation of Connecticut Application August 26, 1936, Serial No. 97,995

6 Claims. (Cl. 16—21)

The present invention relates to improvements in casters, and particularly heavy duty casters such as are used upon trucks or the like, an object being to provide a caster of this character of simple and extremely sturdy construction, and in which ball bearing swivelling means is provided between the horn and the mounting plate. It is particularly proposed to provide in a double ball bearing caster an annular ball bearing race forming member containing both ball races, preferably formed of hardened steel, and which is integrally connected to the horn which forms no part of the ball-races as by projection welding, the welding being at points between the two ball-races so that the hardening of the ball-race portions is not effected by the heat of the welding. A further object is to provide a caster in which double rows of ball bearings are provided and which are so arranged that the overall height of the caster is not appreciably increased over the height of the caster having but a single row of balls.

With the above and other objects in view an embodiment of the invention is shown in the accompanying drawing and this embodiment will be hereinafter more fully described with reference thereto and the invention will be finally pointed out in the claims.

In the drawing:

Fig. 1 is a side elevation of a caster, according to the exemplary illustrated embodiment of the invention.

Fig. 2 is a vertical sectional view taken along the line 2—2 of Fig. 1.

Fig. 3 is a top plan view of the bearing member employed.

Fig. 4 is a sectional view thereof taken along the line 4—4 of Fig. 3.

Figs. 5 and 6 are fragmentary bottom plan views of modified forms of bearing members.

Fig. 7 is a plan view of a modified form of horn containing welding projections.

Similar reference characters indicate corresponding parts throughout the several figures of the drawing.

Referring to the drawing, the caster, according to the exemplary illustrated embodiment shown therein, comprises a horn consisting of a horn top portion 10 preferably of circular form having side leg portions 11—11 between which the caster wheel 12 is mounted upon an axle 13. The horn top 10 is flat and is provided with a circular aperture 14.

An annular bearing plate member 15 having a central aperture 16 is integrally secured to the horn top 10 by projection welding, as at 17, the plate member 15 being provided before assembly with the horn with a plurality of welding points 18 pressed therein and which force slight projections 19 upon the under surface, these projections providing adequate metal for reliably connecting the bearing plate member to the horn top through the welding action, the projections being thereby homogeneously joined with the metal of the horn top. The plate member 15 is provided with an upwardly extended rim flange 20 which forms a ball-race 21 at the upper side, and is provided in surrounding relation to the aperture 16, with an upwardly pressed angular portion 22 which forms a ball-race 23 at the under side within the aperture 14 of the horn top.

As the welding points are between the ball-races the hardening of the latter is not injuriously affected by the welding heat. The homogeneously connected circular horn top 10 and the circular bearing plate 15 provide between the inner and outer ball-races 23 and 21 a double thickness circular reinforcing strut area, arranged between the oppositely directed stresses upon the ball-races, thereby supporting the bearing plate rigidly at its area which would otherwise tend to distort under the load imposed upon the caster. It is thus made possible to form the bearing plate and horn from sheet metal pressed to shape, without impairing the strength necessary to proper functioning of the caster under heavy loads.

The attaching top plate 24 of the caster which may be of rectangular or any other suitable shape is provided centrally with an aperture 25, and in surrounding relation to this aperture is provided with a downwardly dished annular portion 26 forming a ball-race 27 diagonally opposed to and adapted to cooperate with the ball-race 21 of the plate member 15. A threaded stud 28 is engaged in the aperture 25 and is integrally connected to the top plate by welding the head 29 of the stud thereto, as at 30.

The top plate 24 is assembled to the integrally connected horn and plate member 15 by engaging the stud 28 downwardly through the aperture 16 of the plate member, a row of balls 31 being interposed in engagement with the ball-races 21 and 27. A nut 32 is engaged upon the threaded stud and is provided at its upper side with an annular ball-race surface 33 diagonally opposed to and adapted to cooperate with the ball-race 23 of the plate 15, a row of balls 34 being interposed between the plate 15 and the nut 32 in engagement with the ball-races 23 and 33. The nut is secured against rotation upon the stud by means of a locking pin 35 engaged with notches 36 in the nut and with a hole 37 in the stud.

In Figs. 5 and 6 I have shown modified forms of welding projections, the projections 19a in Fig. 5 being spaced and elongated and the projection 19b in Fig. 6 being continuous.

In Fig. 7 I have illustrated a modified form of horn top provided with welding projections 19c, there being a greater number at the front than at the rear trailing part to take the additional strain imposed at the front of the offset of the caster.

It will be observed that the caster structure according to my invention comprises, in addition to the balls, three main parts, i. e., the horn with its integrally connected bearing plate 15, the top plate 24 with its integrally connected stud 28, and the nut 32. The manner of connecting the bearing member to the horn provides a rigid integral horn structure including bearing surfaces, and at the same time permits the bearing member to be of a different metal from the horn, and also permits the horn to be of any desired shape and size irrespective of the diameter of the bearing member.

I have illustrated and described a preferred and satisfactory embodiment of the invention, but it will be understood that changes may be made therein, within the spirit and scope thereof, as defined in the appended claims.

Having thus described my invention, what I claim and desire to secure by Letters Patent is:—

1. In a caster, a horn including a circular horn top area having a central aperture therein, a circular bearing plate member rigidly secured to said horn top and having an upwardly extending annular rim flange forming an outer ball-race at its upper side, and an upwardly extending central annular portion forming an inner ball-race at its under side and having a central aperture coaxial with said aperture of said horn top, said inner ball race being radially inwardly of said aperture of said horn top, and said horn top forming with said bearing plate a circular reinforcing strut area surrounding said inner ball race radially inwardly of said outer ball-race, an attaching plate having an annular ball-race at its under side opposed to said outer ball-race, balls engaged in said outer ball-race, stud means carried by said attaching plate extending downwardly through said aperture of said bearing plate, ball-race means carried by said stud in opposed relation to said inner ball-race, and balls engaged in said inner ball-race.

2. In a caster, a horn including a circular horn top area having a central aperture therein, a circular bearing plate member rigidly secured to said horn top and having an upwardly extending annular rim flange forming an outer ball-race at its upper side, and an upwardly extending central annular portion forming an inner ball-race at its under side and having a central aperture coaxial with said aperture of said horn top, said inner ball race being radially inwardly of said aperture of said horn top, and said horn top forming with said bearing plate a circular reinforcing strut area surrounding said inner ball-race radially inwardly of said outer ball-race, an attaching plate having an annular ball-race at its under side opposed to said outer ball-race, balls engaged in said outer ball-race, said attaching plate having an aperture centrally of its ball-race, a threaded stud engaged in said aperture extending downwardly through said apertures of said bearing plate and horn top and having a flange at its upper end rigidly secured to the upper surface of said attaching plate radially outwardly of said aperture, a nut secured upon said stud having a ball-race surface opposed to said inner ball-race, and balls engaged in said inner ball-race.

3. In a caster, a horn including a circular side wall and a laterally inwardly extending flange forming a circular horn top area having a central aperture therein, a bearing plate member rigidly secured to said horn top and having an upwardly extending annular rim flange forming an outer ball-race at its upper side, and an upwardly extending central annular portion forming an inner ball-race at its under side and having a central aperture coaxial with said aperture of said horn top, said inner ball race being radially inwardly of said aperture of said horn top, and said horn top forming with said bearing plate a circular reinforcing strut area surrounding said inner ball-race radially inwardly of said outer ball-race, an attaching plate having an annular ball-race at its under side opposed to said outer ball-race, balls engaged in said outer ball-race, stud means carried by said attaching plate extending downwardly through said aperture of said bearing plate, ball-race means carried by said stud in opposed relation to said inner ball race, and balls engaged in said inner ball-race.

4. In a caster, a horn including a circular horn top area having a central aperture therein, a circular bearing plate member superengaged with said horn top and having an upwardly extending annular rim flange forming an outer ball-race at its upper side, and an upwardly extending central annular portion forming an inner ball-race at its under side and having a central aperture coaxial with said aperture of said horn top, said inner ball race being radially inwardly of said aperture of said horn top, securing means rigidly connecting said bearing plate to said horn top arranged in a circle radially between said inner ball-race and said outer ball-race, said horn top forming with said bearing plate a circular reinforcing strut area surrounding said inner ball-race radially inwardly of said outer ball-race; an attaching plate having an annular ball-race at its under side opposed to said outer ball-race, balls engaged in said outer ball-race, stud means carried by said attaching plate extending downwardly through said aperture of said bearing plate, ball-race means carried by said stud in opposed relation to said inner ball-race, and balls engaged in said inner ball-race.

5. In a caster, a horn including a horn top having an upper annular flange with an aperture therein, a bearing plate member secured to said horn top flange by securing means arranged in a circle, said plate member having annular bearing races inwardly and outwardly spaced from said securing means.

6. In a caster, a horn including a horn top having an upper annular flange with an aperture therein, a bearing plate member secured to said horn top flange by securing means arranged in a circle, said plate member having annular bearing races inwardly and outwardly spaced from said securing means, the total cross-sectional area of the securing means being greater at the front of said horn top flange than at the rear.

WALTER F. HEROLD.